United States Patent [19]
Frei et al.
[11] 3,708,699
[45] Jan. 2, 1973

[54] HIGH-SPEED ANALOG SWITCHING WITH FET

[75] Inventors: Armin Heinz Frei, Rueschlikon; Peter Vettiger, Thalwil, both of Switzerland

[73] Assignee: International Business Machines Corporation, Armonk, N.Y.

[22] Filed: June 21, 1971

[21] Appl. No.: 154,932

[30] Foreign Application Priority Data

Oct. 9, 1970 Switzerland ........................10475/70

[52] U.S. Cl. ......................307/304, 307/251, 323/4, 330/29, 330/35, 328/151
[51] Int. Cl. ............................................H03k 19/08
[58] Field of Search .....307/251, 304; 323/4; 330/29, 330/35

[56] References Cited

UNITED STATES PATENTS

| | | | |
|---|---|---|---|
| 3,516,003 | 6/1970 | Boone | 330/35 X |
| 3,434,038 | 3/1969 | Vette | 323/4 |
| 3,443,240 | 5/1969 | Santilli | 330/35 X |
| 3,512,096 | 5/1970 | Nagata et al. | 330/29 |
| 3,579,133 | 5/1971 | Harford | 330/29 X |
| 3,488,604 | 1/1970 | Smilowitz | 330/29 |

FOREIGN PATENTS OR APPLICATIONS

| | | | |
|---|---|---|---|
| 952,904 | 6/1961 | Great Britain | 330/29 |

OTHER PUBLICATIONS

"Cascade Field Effect Transistor Applications", Amelco Semiconductor Technical Notes, No. 5, p. 13 [10/13/63].

*Primary Examiner*—Herman Karl Saalbach
*Assistant Examiner*—R. C. Woodbridge
*Attorney*—John A. Jordan et al.

[57] ABSTRACT

A field-effect transistor is inserted in the series feedback path of a bipolar transistor at whose base terminal the analog input signal to be sampled is applied. The bipolar transistor is continuously maintained in its conductive state by drawing a current $I_0$ from the emitter. The field-effect transistor is switched back and forth between its high and low impedance states by a sampling signal applied to its gate. The analog input signal is amplified, and therefore sampled, only when the field-effect transistor is in its low impedance state.

An N-channel sampler-multiplexer is obtained by series-connecting a number of the above-described switches in a chain, with the gate electrodes of the field-effect transistors of all of the stages being connected to a common sampling line, and with the collector electrodes of all of the bipolar transistors of all of the stages delivering their sampled output signals into a common output line. To clearly separate the individual output signals, delay sections are inserted in the output line between neighboring stages.

5 Claims, 4 Drawing Figures

INVENTORS
ARMIN H. FREI
PETER VETTIGER

BY John A. Jordan
ATTORNEY

HIGH-SPEED ANALOG SWITCHING WITH FET

BACKGROUND OF THE INVENTION

The present invention relates to a semiconductor switch, and more particularly to a semiconductor switch which can be used for the sampling of analog signals in data communications and data processing applications.

The high cost of present day communications media requires optimal utilization of the media by subscribers. It has, therefore, become common practice to have a great number of subscribers share one and the same communication channel onto which their messages are time-division multiplexed. To achieve this end, it is necessary that the analog signals received from the subscribers be sampled and then individually assigned to the transmission channel.

A typical example of an analog time-division multiplexed system would consist, for instance, of a rotary switch to which a number N of analog channels of bandwidth $f_0$ are connected. The output of the switch is then connected to an analog-to-digital converter which supplies the digitized output signals to the transmission channel. At the receiving end, the digital signals are reconverted to analog form and distributed to N output lines by another rotary switch working in synchronism with the switch on the transmitter side.

The sampling of the analog signals is typically performed at the Nyquist rate ($f_s \geq 2f_0$), and the amplitude modulated pulse obtained therefrom must have a width allowing for N of them to be packed into a time interval of $1/f_s$ sec. duration without interference. For example, with $N = 8$ time-division multiplexed TV-channels of 5 MHz bandwidth each, a pulse stream having a bit rate of the order of 100 Mbit/sec. must be processed. Each individual pulse must be shaped to within the limits of resolution of the analog-to-digital converter. From this it is clear that the analog switch is a highly important and crucial part of the system.

Known solutions to obtaining analog sampling switches involve, for example, utilization of pulsed diode gates. These gates suffer, however, from the non-ideal I-V characteristics of the Schottky-barrier diodes employed and, therefore, are not considered satisfactory. Another known analog switching arrangement uses a pulsed diode quad which represents a low resistance between the analog signal source and the load resistance, during the time the two current sources connected to the quad are on. While this is, in principle, a good solution, the stringent requirements on the symmetry of the diode quad and the driving system become prohibitive when it comes to using a great number of sampling gates. For example, in a multiplexing system arrangement where N channels requiring N sampling gates are used, N pairs of pulsed current sources are needed for the N input channels to be multiplexed. The generation of these symmetrical current pulses with about a 20 mA amplitude, a pulse width of only a few nsec. and each pair of pulses delayed differently with respect to the clock, represents a major circuit problem.

Still another solution to obtaining analog sampling switches employs simply a field-effect transistor (JFET, MOSFET) which is switched between $R_\infty$ and $R_0$. Since such a field-effect transistor inherently is a high input impedance device a large number thereof can be incorporated in a delay-line structure for multiplexing purposes. This solution, however, presents three major drawbacks, to be explained more fully hereinbelow.

The first major drawback involves the fact that the on-resistance $R_0$ is considerably larger than practical load resistors $R_L$, for high speed applications. The sampled analog value on $R_L$, thus, strongly depends on variations of $R_0$. Since the voltage at the source electrode depends on the analog signal, the on-resistance $R_0$ varies, also. This creates undesired distortions of the sampled signal.

The second major drawback resides in the fact that because of the floating arrangement of the field-effect transistor in the analog path of the circuit, the sum of the gate/source and gate/drain capacitances is responsible for the transients super-imposed on the sampled analog signal, while applying fast rise- and fall-times at the gate. This also results in the sampled signal being undesirably distorted. The final major drawback is based upon the fact that the drain and source of the field-effect transistor are high-impedance points, and together with the gate/drain- and gate/source-capacitances yield high RC time constants, thus reducing the speed of operation of this analog switch.

SUMMARY OF THE INVENTION

It is, therefore, an object of the present invention to provide a new semiconductor switch for sampling analog signals.

It is a further object of the present invention to provide an analog sampling device which exhibits the high impedance characteristics of a field-effect transistor at the sampling pulse input, thus allowing for multiplexing, and which obviates the deficiencies of the prior art analog sampling devices.

Accordingly, the invention relates to a semiconductor switch for sampling analog input signals, with at least one stage comprising at least two transistors, characterized in that the first one of the transistors of each stage is in common emitter configuration as an amplifier, and a current is continuously drawn from the emitter thereof. The second one of the transistors is arranged in the emitter circuit of the first transistor as a controllable emitter resistance, such that upon application of a sampling pulse at the gate terminal of the second transistor, it is switched from its high-impedance state to its low-impedance state so as to change the gain of the first transistor from zero to a fixed value, thereby causing the analog input signal applied at the base terminal of the first transistor to be sampled in accordance with the sampling pulses received.

The foregoing and other objects, features and advantages of the invention will be apparent from the following more particular description of the preferred embodiments of the invention as illustrated in the accompanying drawings.

DESCRIPTION OF THE PREFERRED EMBODIMENTS

Figure 1A:
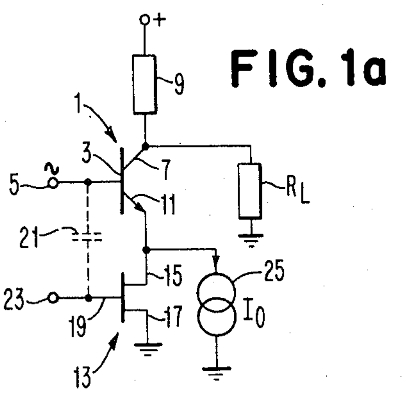
FIG. 1*a* shows a circuit diagram of the semiconductor switch in accordance with the principles of the present invention.

In FIG. 1*a* there is shown a bipolar transistor 1 whose base electrode 3 is connected to an input terminal 5 to which the analog input signal is applied. The collector electrode 7 of transistor 1 is connected to the positive terminal of a suitable voltage source via a resistor 9, and also to a load resistance $R_L$ whose other end terminates at ground.

The transistor 1 will amplify the input signal applied to its base electrode 3 in dependence on the resistance between its emitter electrode 11 and ground, the gain being determined by the relations $g = R_L/R_E$, where $R_E$ is the series resistance in the emitter current. Obviously, when the emitter series resistance $R_E$ is varied, the gain is varied with it.

It has been suggested in the prior art to replace the emitter series resistance $R_E$ by another bipolar transistor, thus enabling $R_E$ to be variable by controlling the conductivity of that bipolar transistor. While this might work satisfactorily for low speed applications, the speed achievable is entirely insufficient for communications or data processing applications. This is so because the bipolar transistor replacing the emitter series resistance has to be operated in its saturation region and, the time required for bringing the transistor out of the saturation region is too long to permit pulses with a high repetition rate to be supplied to its control electrode.

To overcome these difficulties, there is, therefore, provided, in accordance with the principles of the present invention, an arrangement whereby the emitter series resistance of transistor 1 comprises a field-effect transistor 13 (FET). The drain electrode 15 of FET 13, as shown in FIG. 1, is connected to the emitter electrode 11 of bipolar transistor 1 while its source electrode 17 is connected to ground. Control signals are applied to gate electrode 19 of FET 13. The FET employed here may advantageously be of the MESFET type (metal-semiconductor field-effect transistor), but other types may be used as well. It should be noted that one of the basic advantages in using an FET resides in the fact that such a device does not need any recovery time owing to the fact that the saturation voltage is zero. In addition, there is linearity for infinitely small signals. The linearity is present up to about one third of the pinch-off voltage.

In operation, FET 13 is switched back and forth between its low and high ($R_O$— and $R_\infty$) impedance states by a control signal applied to its gate electrode 19. This control signal may, for example, take the form of a pulse train. In such a mode of operation, the analog input signal applied to base electrode 3 of bipolar transistor 1 will be sampled in accordance with the pulse repetition rate of the said pulse train applied to control electrode 19. This sampling is due to the fact that the analog signal at base electrode 3 is amplified only in the state of low emitter series feedback resistance ($R_O$), i.e., when FET 13 is in its low impedance state. At high emitter series resistance ($R_\infty$), bipolar transistor 1 does not amplify and, accordingly, there will be no signal at its collector 7.

The current flowing from emitter 11 of transistor 1 is a function of the gate-drain capacitance $C_{gd}$ of FET 13 and the leading edge $dU_s/dt$ of the sampling pulse. The capacitance $C_{gd}$ between gate and drain electrodes is responsible for the occurance of a spike in the load $R_L$, which is highly undesirable. This spike may be compensated by connecting a small capacitor 21 between inputs 5 and 23, respectively, for the analog signal and the sampling signal. This compensating effect is obtained through the generation of a contemporary spike having opposite phase, owing to the fact that capacitor 21 causes a 180° phase shift with respect to the capacitance between gate and drain electrodes 19 and 15, respectively. This compensation is of great importance to the precision of the form of the output pulses, particularly with regard to their leading edges. It should be noted here that there are also negative spikes created, following the trailing edges of the sampling pulses, but these are of interest only in connection with crosstalk onto subsequent pulses.

An important feature of the present invention resides in the fact that bipolar transistor 1 is maintained in continuous operation, i.e., conductive, by drawing a current $I_O$ from its emitter electrode 11, via a negative current source 25. The advantage of this will be realized when it is recognized that bipolar transistors are able to switch only rather slowly. However, when maintained conductive all the time, the junctions need not be charged at each sampling time and the disadvantages incident to slow switching are obviated.

Figure 1B:
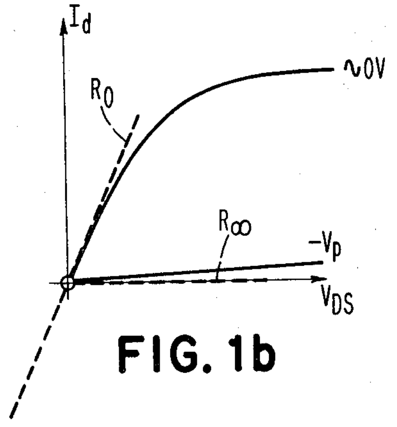
FIG. 1*b* depicts the I–V output characteristic of a field-effect transistor.

The current $I_O$ is adjusted such that for zero gate voltage on FET 13, the voltage on drain electrode 15 is equal to the voltage on source electrode 17. Because field-effect transistor 13 thus operates at the origin of the I–V characteristics, as shown in FIG. 1b, there is no modulation by the sampling pulses. If, for example, the analog input signal at terminal 5 is 0.7V (corresponding to analog information zero), then the potential at emitter 11, as well as at source 17, will be zero, while gate 25 is kept at −4V (cut-off voltage). When the gate voltage is increased to 0V during sampling, then only the resistance between drain and source is changed from $R_\infty$ to $R_O$; the potential between drain and source, however, remains constant.

Figure 2:
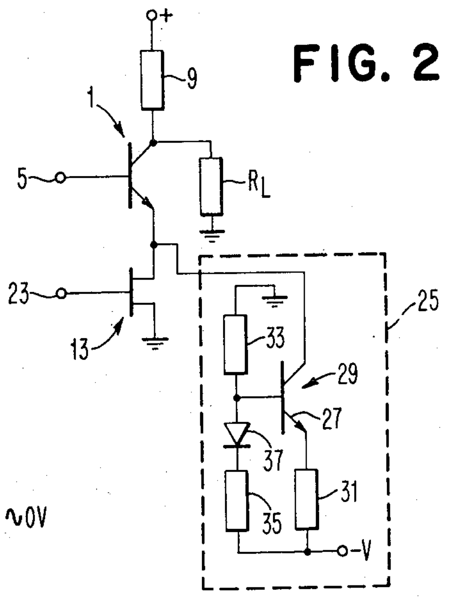
FIG. 2 depicts a circuit diagram embodying an example of a current source that may be used in connection with the circuit of FIG. 1*a*.

The current source 25, drawing a current $I_O$ from emitter 11 of bipolar transistor 1, may be realized, very simply by employing a source of negative voltage connected to emitter 11, via a high ohmic resistor. Alternatively, current source 25 may be realized by employing another active element, as the high ohmic resistance, as shown in FIG. 2. There, a negative voltage is connected to the emitter 27 of transistor 29, via emitter series resistance 31. Resistors 33 and 35 are provided as a voltage divider, fixing the base potential of transistor 29 at 0.7 volts above the emitter potential. A diode 37 is provided in the base circuit to improve the temperature dependency of the emitter-base junction. It should be recognized that instead of employing a transistor, such as a bipolar transistor, a field-effect transistor may likewise be used here.

Figure 3:
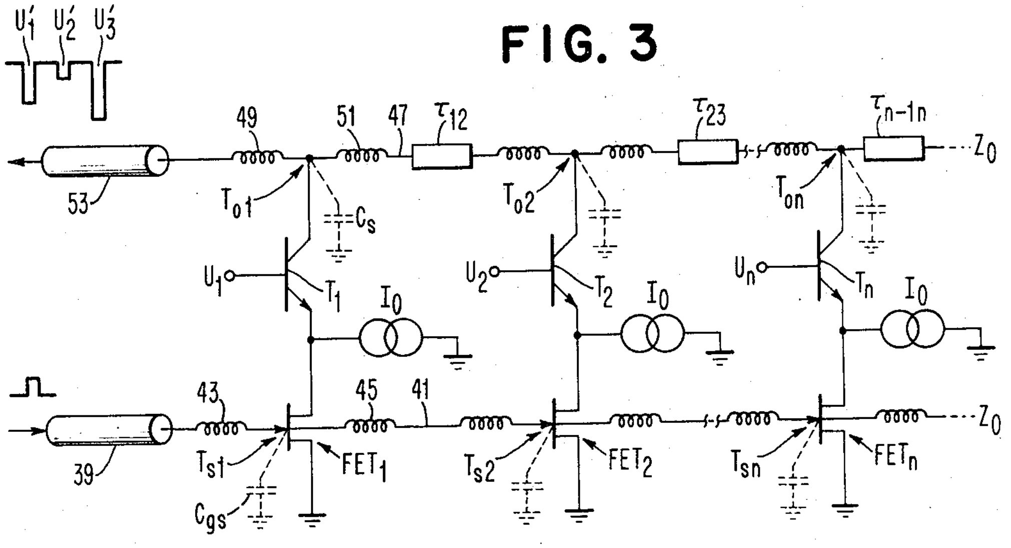
FIG. 3 shows a schematic diagram of a multiplexer arrangement comprising a number of the switches shown in FIG. 1*a*.

In FIG. 3 a number of switches N, of the type described above, are connected in a chain to form a sampler-multiplexer. Bipolar transistors $T_1$ through $T_n$ are fed with analog input voltages $U_1$ through $U_n$, applied to their respective input terminals. The emitters of transistors $T_1$ through $T_n$ are each connected to respective current sources $I_O$, as well as to the drain electrodes of field-effect transistors $FET_1$ through $FET_n$. The respective source electrodes of these field-effect transistors are connected to ground while their respective gate electrodes are consecutively connected to the sampling pulse input 39. The sampling line 41 has constant-k T-sections $T_{s1}$ through $T_{sn}$, each formed by two series inductances, as for example, inductances 43 and 45, and the apparent gate-source capacitance $C_{gs}$ of the appertaining field-effect transistor $FET_1$. The sampling line is terminated with its characteristic impedance $Z_O$ to avoid reflection of the sampling pulses.

The output line 47 of the multiplexer may also contain constant-k T-sections $T_{o1}$ through $T_{on}$, encompassing, for example series inductances 49 and 51 and the collector stray capacitance $C_s$. The output line 47 is terminated with its characteristic impedance $Z_O$.

The sampling pulse entering sampling line 41 will reach the first stage of the multiplexer at field-effect transistor $FET_1$ at a certain time, and after a short delay resulting from T-sections $T_{s1}$ and $T_{s2}$, it will have propagated to field-effect transistor $FET_2$ of the second stage, and so on. Upon arrival of the sampling pulse at any one stage, the field-effect transistor $FET_i$ of that stage is switched from its high-impedance state $R_\infty$ to its low-impedance state $R_O$, thus rendering the associated bipolar transistor $T_i$ amplifying, causing the analog input signal $U_i$ applied at the base of that transistor $T_i$ to be sampled. At the termination of the sampling pulse, the field-effect transistor $FET_i$ returns to its high-impedance state $R_\infty$ thus cutting off the output signal at the collector of the bipolar transistor $T_i$. Accordingly, the analog input signals $U_1$ through $U_n$ are sampled with the repetition rate of the sampling signal.

The sampled analog signals are fed into the output line 47 and propagate to output terminal 53. In order that the output signals are clearly separated from one another, output line 47 is provided with delay lines $\tau_{12}$, $\tau_{23}$ through $\tau_{n-1,\,n}$, arranged between neighboring multiplexer stages, as indicated by their subscripts. It should be noted, however, that it may be advantageous to locate the intermediate delay lines in sampling line 41 instead of in output line 47, the rule being that the delay lines should be located where they best serve to minimize the distortions on the output signal.

What is claimed is:

1. A sampling circuit for sampling an analog input signal in response to a sampling signal comprising:

transistor amplifier means coupled in common emitter configuration and arranged to amplify said analog input signal in accordance with the magnitude of the series impedance in the emitter circuit thereof;

current source means coupled to said emitter to continuously draw a fixed current therefrom;

field effect transistor means having a source, drain and gate electrode with the drain-source variable impedance path thereof coupled in series in said emitter circuit and with said gate electrode coupled to said sampling signal so as to vary said impedance in accordance with said sampling signal, said sampling signal acting to switch said field effect transistor means between a low conduction state and high conduction state so as to thereby vary the series impedance in said emitter circuit so as to increase the gain of said transistor amplifier means from a level insufficient to provide any appreciable output signal to a level sufficient to provide an appreciable output signal representation of a sample of said analog input signal; and capacitor means coupled between said gate electrode and the base electrode of the transistor of said transistor amplifier means.

2. The sampling circuit as set forth in claim 1 wherein said transistor is a bipolar transistor.

3. A sampling circuit for sampling an analog input signal in accordance with a sampling signal, comprising:

bipolar transistor means having an emitter, base and collector and connected in common emitter circuit configuration as an amplifier for amplifying said input signal coupled to said base, means for continuously causing a fixed current to flow in said emitter;

field effect transistor means having a source, drain and gate electrode with the source-drain path arranged in the emitter circuit of said bipolar transistor means as a controllable resistance in series with said emitter and with said gate electrode coupled to said sampling signal, said sampling signal comprising pulses which switch said field effect transistor means from a high impedance state where the gain of said bipolar transistor means is zero to a low impedance state where the gain of said bipolar transistor means changes to a fixed value and said input signal is sampled; and capacitor means coupled between the base of said bipolar transistor means and the gate electrode of said field effect transistor means.

4. The sampling circuit as set forth in claim 3 wherein said means for continuously causing a current to flow comprises a current source coupled to said emitter for drawing a fixed current therefrom.

5. The sampling circuit as set forth in claim 4 wherein said current source comprises further transistor means arranged so that the base electrode thereof is held at a quiescent voltage level by voltage divider circuit means with said voltage divider circuit means including a diode arranged to compensate for variations in current in said further transistor, caused by variations in temperature.

* * * * *